Dec. 15, 1970   V. SHANOK ET AL   3,547,515

COMBINATION PROTECTIVE AND DECORATIVE EDGE TRIM

Filed Sept. 26, 1968

INVENTOR.
VICTOR SHANOK
JESSE P. SHANOK
BY
Friedman & Goodman

United States Patent Office 3,547,515
Patented Dec. 15, 1970

3,547,515
COMBINATION PROTECTIVE AND
DECORATIVE EDGE TRIM
Victor Shanok and Jesse P. Shanok, Brooklyn, N.Y., assignors to Glass Laboratories Company, Brooklyn, N.Y., a New York limited partnership
Filed Sept. 26, 1968, Ser. No. 762,739
Int. Cl. G02b 5/12; E04c 2/38; B06b 7/00
U.S. Cl. 350—97                     4 Claims

ABSTRACT OF THE DISCLOSURE

An edge trim formed of an edge-attaching clear plastic body having encapsulated therein first and second strips of selected materials of different widths and different visual appearances or impacts, the encapsulated materials being so arranged that in the mounted position of the product along an edge they are visual to selectively varying degrees depending upon the vantage point of the viewer relative to the product. Thus, when the edge trim is used on a car door, for example, the mere opening of the door prominently exposes the one of the selected materials which is brightly colored (i.e., red) to thereby provide a visual signal of the open condition of the door, while the closing of the door effectively masks this brightly colored material from view and instead exposes the second, less brightly colored material to the viewer.

---

The present invention relates generally to edge trimming material, and more particularly to an attachable edge trim for an automobile door or the like which provides a different visual appearance depending upon the opened or closed condition of the automobile door.

For purposes of illustration only, and not necessarily as a limitation of use, the edge trim hereof is advantageously attached along the exposed outer edge of an automobile door and, in this attached position, makes a significant contribution not only to protecting the door but also in providing a visual signal that the door is open. Thus, the open automobile door which is unavoidably projected into the path of approaching traffic and passersby and as such, represents a potential safety hazard, is significantly rendered less of a hazard because of the highly visible nature of the edge trim. The achievement of this, however, cannot be permitted to detract from the appearance of the automobile; a bright, highly visible trim, in other words, is not needed nor is desirable when the automobile door is closed since it then performs no safety function but only detracts from the car's appearance. In known prior art protective edge trims, however, particularly those which are contemplated for used along the edge of a car door, the visual appearance of the trim is essentially the same when viewed from the side, as occurs when the car door is closed, or when viewed head on, as occurs when the door is swung open and the protected edge is exposed directly to the viewer. Thus, these prior art edge trims cannot adequately function as a safety signal device without noticeably detracting from the car's appearance, or vice versa.

Broadly, it is an object of the present invention to provide an improved edge trim, particularly for the edge of a car door, overcoming the foregoing and other shortcomings of the prior art. Specifically, it is an object to provide an automobile door edge trim having different colored materials of construction which are so arranged that one or the other of these materials is prominently projected into view, depending upon whether the door is opened or closed.

A combination protective and decorative edge trim demonstrating objects and advantages of the present invention includes a clear, essentially U-shaped plastic body having encapsulated therein two superimposed strips of first and second selected materials, the first selected material being a bright red reflective glass and the second selected material an aluminum foil. The bright red material is arranged in that portion of the encapsulating plastic body that overlies the edge of the automobile door such that when the door is swung into its open position, this portion of the trim is prominently projected into view and provides an unmistakable, visual signal that the door is open. The second selected material is disposed beneath the bright red material and extends beyond opposite sides thereof such that when the car door is closed, and thus only the side of the edge trim is visible, only the second selected material is at that time prominently visible. By selecting silver color for the second material, it, of course, has the simulated appearance of chrome and thus is compatible with providing a decorative appearance to the car.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying drawings, wherein:

FIG. 4 illustrates the appearance of the edge trim when the door is in a partially open position and as seen from the vantage point behind the door; and FIG. 5 illustrates the changed appearance of the edge trim with the automobile door in its closed position resulting in a partial masking of the edge trim.

Figure 4:
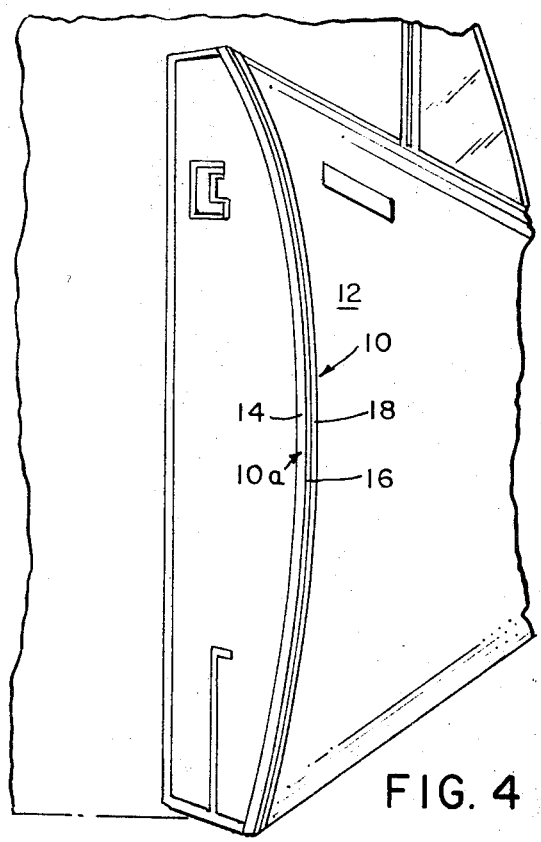
FIGS. 4 and 5 illustrate the edge trim in position along an exposed edge of an automobile door, namely, to wit.
Figure 5:
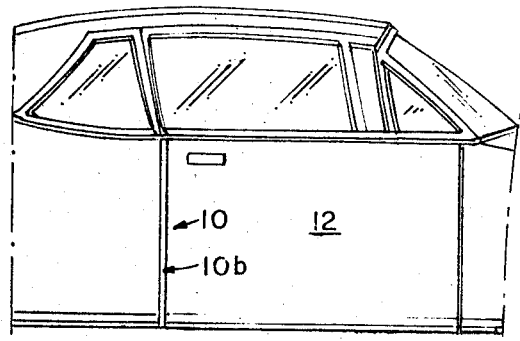

Reference is now made to the drawings, and in particular to FIGS. 4 and 5, illustrating the combination protective and decorative edge trim hereof, generally designated 10, in its operative position along an outer, exposed edge of an automobile door 12. Specifically, in the partially open position of the automobile door 12, as illustrated in FIG. 4, the vantage point of a viewer standing behind the door is such that the edge of the edge trim 10, herein designated 10a, is prominently presented to this viewer; on the other hand, with the door 12 in its closed position, as illustrated in FIG. 5, only the side 10b of the edge trim is prominently visible. In accordance with the present invention, the trim edge 10a has an optimum visible appearance, consisting, for example, of a material having a bright red color, whereas the trim side 10b has a contrasting, preferably less visible appearance, all as will be described in greater detail subsequently herein. However, by virtue of the different visible appearances of the trim portions 10a and 10b, it should be readily apparent that a visible signal is automatically provided reflecting the condition of the automobile door 12. Thus, to traffic or a passerby approaching the car from behind and along a path into which the open door 12 is projected, the bright red of the trim portion 10a is an effective safety signal. In the closed position of the car door 12, however, the edge 10a is masked from view and the less prominent edge portion 10b is then visible, which portion has a silver color more compatible to its decorative function.

Figure 2:
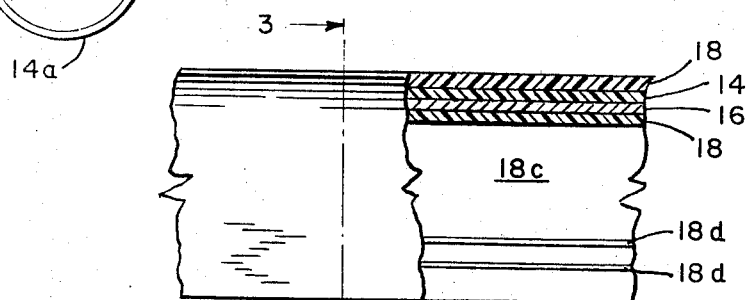
FIG. 2 is a side elevational view of the edge trim, on an enlarged scale and partially in section taken on line 2—2 of FIG. 3, illustrating structural details of the edge trim.
Figure 3:
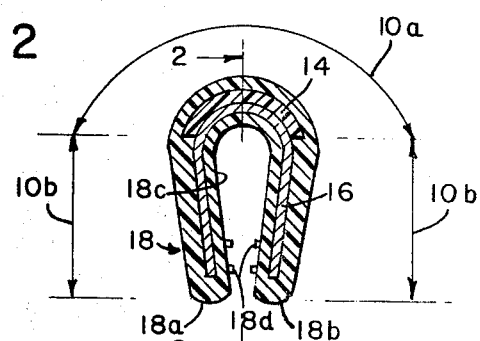
FIG. 3 is an end elevational view of the edge trim, in section taken on line 3—3 of FIG. 2, illustrating further structural features of the product.

In a preferred embodiment of the edge trim 10, as illustrated more particularly in FIGS. 2, 3, the trim will be understood to be comprised of an elongated body which, as best shown in FIG. 3, is substantially U-shaped in cross section and includes in the area thereof coextensive with the previously noted edge 10a an encapsulated strip of a selected first material 14, preferably a reflective material such as glass having the previously noted prominent color red or a similar color. Arranged beneath the first material 14 is a strip of a selected second material 16 which is preferably an aluminum foil and thereby has a less prominent silver color. As may be clearly appreciated from FIG. 3, the width of the strip of the second material 16 is considerably greater than that of the first material strip 14 such that there are portions thereof extending from opposite sides of the material 14 into areas of the edge trim 10 which are coextensive with the previously noted sides 10b of the product.

Completing the construction of the edge trim 10 is an encapsulating outer U-shaped body 18, preferably fabricated of a clear or transparent thermoplastic material. The U-shaped body 18, as clearly illustrated in FIG. 3, has two legs 18a and 18b bounding an internal mounting opening 18c therebetween, which will be understood to be an appropriate size and extent to accommodate therein the edge of the automobile door 12. A pair of spaced apart, parallel gripping projections 18d are advantageously molded on the surface bounding opening 18c and have been found to contribute to a firm engagement of the edge trim 10 on whatever edge the trim is placed. In some instances, in fact, it is advisible to also use an adhesive coating on this internal surface and the resulting engagement, for all practical purposes, is permanent.

Figure 1:
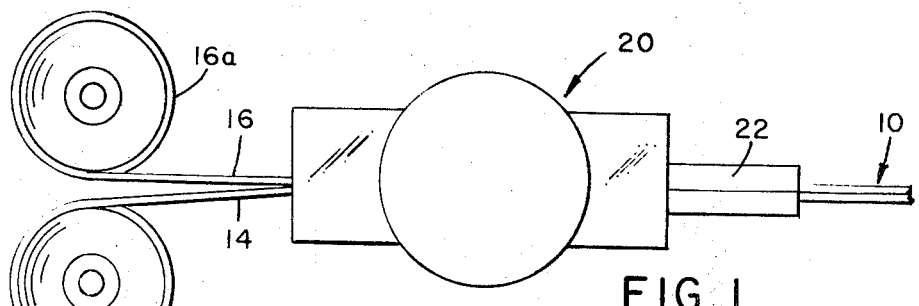
FIG. 1 is a diagrammatic plan view of exemplary apparatus for making the combination protective and decorative edge trim of the present invention.

Although any one of several commercial embodiments of apparatus are available for producing the edge trim 10 as hereinbefore described, the apparatus preferred is a conventional extrusion head, generally designated 20, such as is diagrammatically illustrated in FIG. 1. In the operation of this apparatus, the first material 14 is appropriately put up in a supply roll 14a, as is also the second material 16 in a supply roll 16a, and these two materials 14, 16 are then appropriately fed, in contacting relation with each other, into the extruder head 20. During passage through the extruder head 20, the two strips of material 14, 16 are appropriately encapsulated within a clear plastic body and then fed through a shaping die 22 which shapes the plastic body 18, the aluminum foil 16 and the glass strip 14 into the U-shape which has already been noted and which is clearly illustrated in FIG. 3. The opening of the shaping die 22 will also be understood to have provision for molding of the gripping projections 18d on the resulting product.

From the foregoing description, it should therefore be readily appreciated that the combination protective and decorative edge trim 10 by virtue of having the first material 14 extend only throughout an area which is coextensive with the actual edge to be protected and having a second material 16, with an appearance which is differentiated from the appearance of the first material, of an extent which is coextensive with bordering areas of the edge to be protected, thus provides an appearance in which the two materials 14 and 16 are selectively visible to varying degrees as a function of the vantage point of the viewer relative to the edge trim. That is, as already noted in connection with FIG. 4, when the viewer is looking directly at the edge portion 10a, naturally the first material 14 is the most prominently visible portion of the edge trim, whereas, when the vantage point of the viewer is to the side of the edge trim, the second material 16 coextensive with the edge side 10b is then the portion thereof which is the most prominently visible. Thus, the edge trim 10 when used along the edge of a door is effective in providing one visual signal or appearance indicating the open condition of the door and a second visual appearance when the door is closed.

A latitude of modification, change and substitution is intended in the foregoing disclosure, and in some instances some features of the invention will be employed without a corresponding use of other features.

What is claimed is:

1. A combination protective and decorative edge trim for a structure having an edge of a prescribed extent bounded by prescribed bordering areas, said trim comprising a first selected strip of reflective material having an optimum visible appearance and of an extent corresponding to that of said edge, a second selected material comprising of a strip of metallic foil underlying said first material and having an appearance differentiated from that of said first material and of an extent corresponding to the total extents of said edge and said bordering areas, and a resilient U-shaped mounting body fabricated of transparent plastic operatively arranged in encapsulating position about said first and second materials such that said body is adapted to be operatively mounted along said structure edge to respectively position said first material in overlying relation to said edge and said second material in overlying relation to said bordering areas, whereby said first and second materials are visible to selectively varying degrees as a function of the vantage point of the viewer relative to said edge trim.

2. An edge trim as defined in claim 1 wherein said first selected material is a strip of reflective glass and said second selected material is a strip ol aluminum foil.

3. An edge trim as defined in claim 2 wherein said encapsulating plastic body has an interior mounting opening bounded by leg portions thereof and gripping projections are formed on the surface bounding said mounting opening.

4. An edge trim as defined in claim 3 including an adhesive coating on said mounting opening surface effective to provide a firm engagement of said edge trim to a structure edge projected into said mounting opening.

References Cited

UNITED STATES PATENTS

| | | | |
|---|---|---|---|
| 2,928,201 | 3/1960 | Shanok et al. | 52—716 UX |
| 3,138,834 | 6/1964 | Shanok et al. | 52—716 UXD |
| 2,049,367 | 7/1936 | Gerber | 350—97 |
| 2,216,576 | 10/1940 | Sinsabauch | 350—97 |
| 3,017,713 | 1/1962 | Butler | 350—97 X |
| 3,152,950 | 10/1964 | Palmquist et al. | 293—54 DUX |
| 3,371,447 | 3/1968 | Ruff et al. | 293—54 DUX |

PAUL R. GILLIAM, Assistant Examiner

U.S. Cl. X.R.

49—462; 52—716; 293—69